(12) United States Patent
Al-Husseini

(10) Patent No.: US 12,170,025 B2
(45) Date of Patent: Dec. 17, 2024

(54) SYSTEM AND METHOD FOR CALCULATION AND DISPLAY OF FORMATION FLIGHT INFORMATION ON AUGMENTED REALITY DISPLAY DEVICE

(71) Applicant: U.S. Army DEVCOM, Army Research Laboratory, Adelphi, MD (US)

(72) Inventor: Mahdi Al-Husseini, Douglasville, GA (US)

(73) Assignee: The United States of America as represented by the Secretary of the State, Washington, DC (US)

( * ) Notice: Subject to any disclaimer, the term of this patent is extended or adjusted under 35 U.S.C. 154(b) by 131 days.

(21) Appl. No.: 18/097,669

(22) Filed: Jan. 17, 2023

(65) Prior Publication Data

US 2023/0360539 A1 Nov. 9, 2023

Related U.S. Application Data

(60) Provisional application No. 63/301,482, filed on Jan. 20, 2022.

(51) Int. Cl.
*G08G 5/00* (2006.01)
*G06F 3/01* (2006.01)
(Continued)

(52) U.S. Cl.
CPC .......... *G08G 5/0021* (2013.01); *G06F 3/012* (2013.01); *G06T 11/00* (2013.01); *G08G 5/0008* (2013.01); *G08G 5/045* (2013.01)

(58) Field of Classification Search
CPC .... G08G 5/0021; G08G 5/0008; G08G 5/045; G06F 3/012; G06T 11/00
See application file for complete search history.

(56) References Cited

U.S. PATENT DOCUMENTS

| | | | |
|---|---|---|---|
| 6,926,233 B1 | 8/2005 | Corcoran, III | |
| 7,024,309 B2 | 4/2006 | Doane | |

(Continued)

OTHER PUBLICATIONS

14 C.F.R. § 91.111 "Operating near other aircraft" (Jan. 1, 2011).
(Continued)

*Primary Examiner* — Edwin A Young
(74) *Attorney, Agent, or Firm* — Eric B. Compton

(57) ABSTRACT

Disclosed are systems and associated methods for calculating and displaying formation flight information, to include aircraft spacing, predicted trajectory data, collision avoidance alerts, time on target details, and chalk-specific information, on an augmented reality display designed to interface with aviation helmets. Two or more networked computing devices, each on a separate aircraft, collect some combination of aircraft altitude, location, and inertial data, preform certain calculations, and then develops a virtual overlay according to aircraft relative position and nearby aircraft trajectories. The virtual overlay is further informed by compass and gyroscopic data from an operatively coupled augmented reality display device. The developed virtual overlay is then transmitted to the display device for viewing by the pilot. The display of relevant formation flight information using augmented reality tools may result in improved formation flight spacing, emergency procedure response, and collision avoidance.

20 Claims, 11 Drawing Sheets

(51) Int. Cl.
    *G06T 11/00*     (2006.01)
    *G08G 5/04*     (2006.01)

(56) References Cited

U.S. PATENT DOCUMENTS

| | | | |
|---|---|---|---|
| 8,949,090 B2 | 2/2015 | Whitehead et al. | |
| 9,767,768 B2* | 9/2017 | Venkitaraman | G09G 5/377 |
| 9,852,547 B2 | 12/2017 | Bostick et al. | |
| 10,301,037 B2 | 5/2019 | Frolov et al. | |
| 10,656,643 B1* | 5/2020 | Bertram | B64D 45/00 |
| 2015/0168728 A1* | 6/2015 | Kobayashi | G06F 3/012 |
| | | | 345/156 |
| 2022/0051585 A1* | 2/2022 | Robinson | G06F 3/012 |

OTHER PUBLICATIONS

Army Training Publication No. 3-04.1 "Aviation Tactical Employment," Apr. 2016.

A. Hiliuta, R. Landry and F. Gagnon, "Fuzzy corrections in a GPS/INS hybrid navigation sys-tem," in IEEE Transactions on Aerospace and Electronic Systems, vol. 40, No. 2, pp. 591-600, Apr. 2004.

Ananth Ranganathan, "The Oculus Insight positional tracking system," AI Accelerator Institute, Jun. 27, 2022, available at: https://www.aiacceleratorinstitute.com/the-oculus-insight-positional-tracking-system-2/.

U.S. Appl. No. 63/303,993, filed Jan. 28, 2022.

\* cited by examiner

SYSTEM AND METHOD FOR CALCULATION AND DISPLAY OF FORMATION FLIGHT INFORMATION ON AUGMENTED REALITY DISPLAY DEVICE

CROSS REFERENCE TO RELATED APPLICATION(S)

This application claims the benefit of U.S. Provisional Patent Application No. 63/301,482 filed Jan. 20, 2022, which is herein incorporated by reference in its entirety for all purposes.

GOVERNMENT INTEREST

The invention described herein may be manufactured, used, and licensed by or for the United States Government.

BACKGROUND

1. Technical Field

The present invention pertains to formation flight information, and more particularly to the calculation and display of predicted trajectory data, collision avoidance alerts, time on target details, and chalk-specific information on an augmented reality device, using navigational tools to include inertial and global positioning systems.

2. Background Art

The following is a tabulation of some prior art that presently appears relevant (and are herein incorporated by reference in their entirety):

| U.S. Patents | | | |
|---|---|---|---|
| Pat. No. | Kind Code | Issue Date | Patentee |
| 6,926,233 | B1 | Aug. 9, 2005 | Corcoran, III |
| 7,024,309 | B2 | Apr. 4, 2006 | Doane |
| 8,949,090 | B2 | Feb. 3, 2015 | Whitehead et al. |
| 9,852,547 | B2 | Dec. 26, 2017 | Bostick et al. |
| 10,301,037 | B2 | May 28, 2019 | Frolov et al. |

3. Background

The Federal Aviation Administration defines formation flight in 14 C.F.R. § 91.111 as operating near other aircraft, along with a series of operational requirements regarding collision hazards and passengers for hire. Generally, formation flight consists of two or more aircraft ordered by serial and chalk, with a clear and well-defined delineation of in-air responsibilities, and a shared objective. Safe formation flight requires a thorough understanding of route structures, aircraft aerodynamics, procedures relating to lost visual contact and lost communication, in-flight link-up procedures, lead change procedures, emergency procedures, and more.

Timely, tight, and precise formation flight is an essential task for several military missions which collectively engage a wide range of rotary-wing and fixed-wing aircraft. The United States Army Aviation enterprise especially prides itself on its Air Assault mission-set, typically involving some combination of UH-60 Black Hawk and CH-47 Chinook helicopters. Air Assault is the strategic movement of Soldiers, typically light infantry, into and across the battlefield to seize and maintain critical territory. Air Assault further encompasses several unique capabilities to include fast-roping, rappelling, and special patrol insertion and extraction. The $101^{st}$ Airborne Division is the United States Army's light infantry division specializing in Air Assault operations, and Air Assault training is conducted at several specialized Air Assault schools across the United States.

Formation flight, although a force multiplier on the battlefield, is inherently risky. There are a multitude of well-documented case studies detailing fatal formation flight accidents on the civilian and military side alike, the vast majority being mid-air collisions between formation aircraft caused by either failing to properly execute emergency procedures or failing to maintain situational awareness of nearby aircraft.

Augmented reality displays provide situationally relevant information in real-time in both visually degraded environments (such as during nighttime operations) and environmentally hazardous environments (such as during formation flight). Army Aviators already train and maintain proficiency on military heads-up displays during nighttime operations; these systems are designed to integrate with existing night vision devices.

SUMMARY

Described is an intelligent augmented reality system and associated methods, featuring networked computing devices and at least one augmented reality display device. These devices provide relevant information, and thereby increased situational awareness, to pilots engaged in formation flight, to ensure enhanced flight operations.

Herein, are disclosed various embodiments for systems and associated methods for calculating and displaying formation flight information, to include aircraft spacing, predicted trajectory data, collision avoidance alerts, time on target details, and chalk-specific information, on an augmented reality display designed to interface with aviation helmets. Two or more networked computing devices, each on a separate aircraft, collect some combination of aircraft altitude, location, and inertial data, preform certain calculations, and then develops a virtual overlay according to aircraft relative position and nearby aircraft trajectories. The virtual overlay is further informed by compass and gyroscopic data from an operatively coupled augmented reality display device. The developed virtual overlay is then transmitted to the display device for viewing by the pilot. The display of relevant formation flight information using augmented reality tools may result in improved formation flight spacing, emergency procedure response, and collision avoidance.

These and other embodiments of the invention are described in more detail below.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
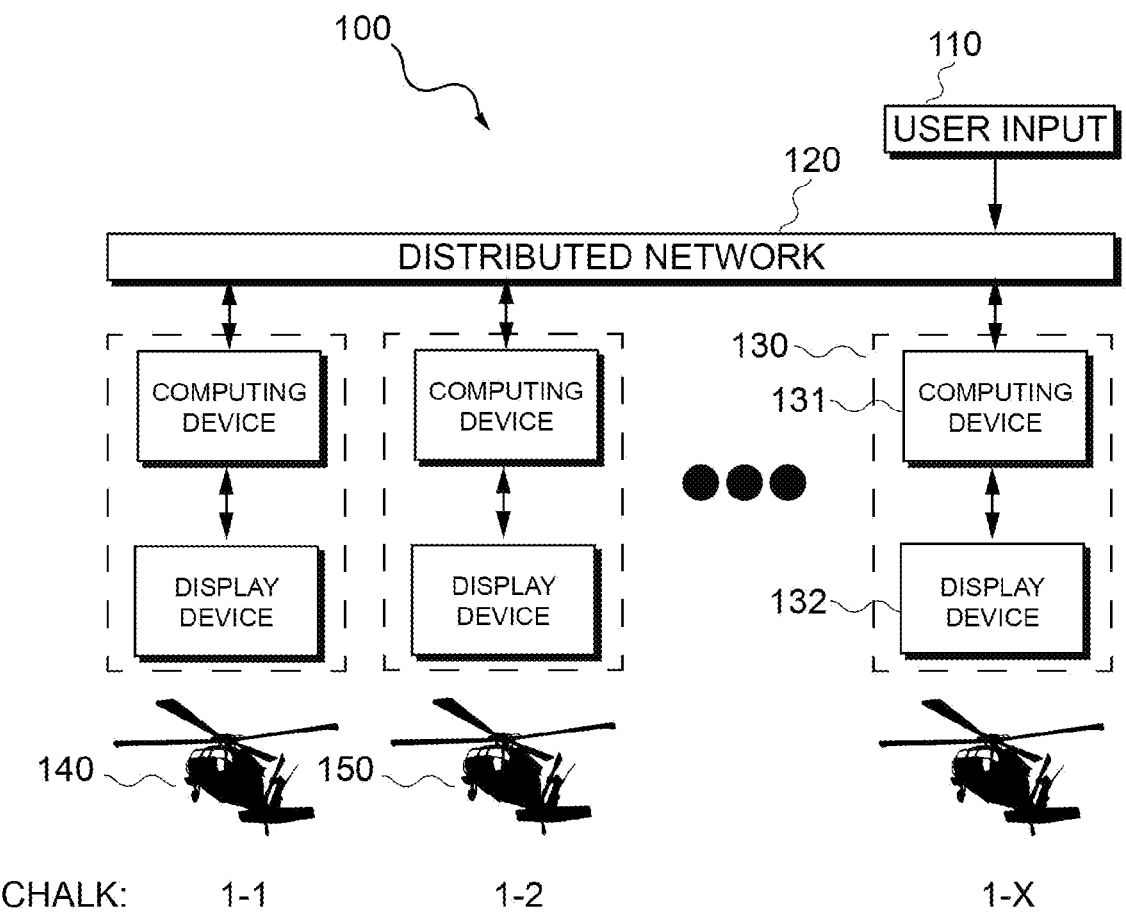
FIG. 1 illustrates an example of a distributed data network across a serial during formation flight along with associated hardware for each chalk aircraft, in accordance with an embodiment of the present invention.
Figure 2:
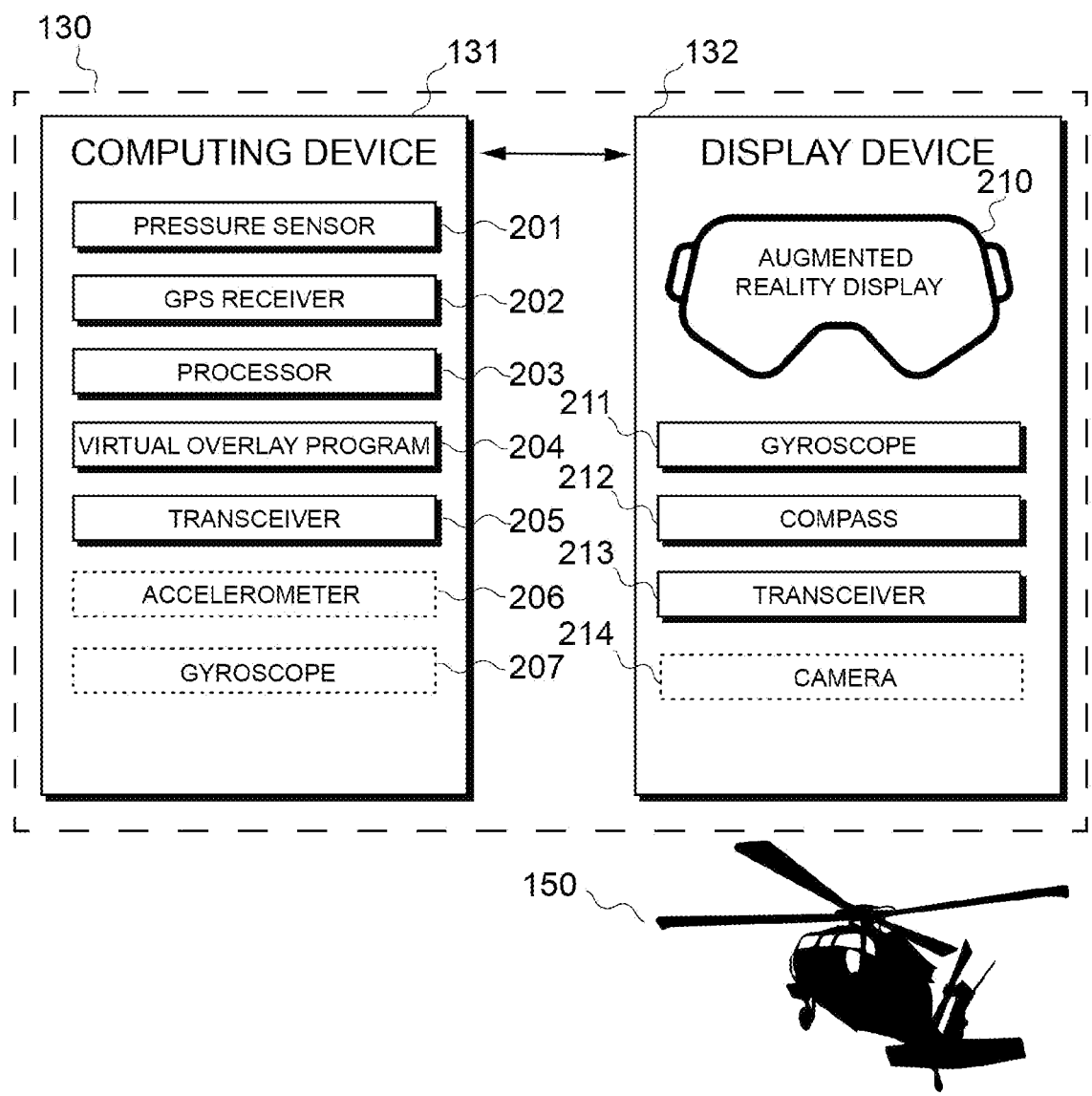
FIG. 2 depicts an example of the subcomponents of operatively coupled computing and display devices for an individual aircraft during formation flight, in accordance with an embodiment of the present invention.

The concise, intelligent, and organized presentation of aircraft data using heads-up displays and similar augmented reality applications has resulted in improved safety outcomes and enhanced overall performance. The present invention takes advantage of advances in networked applications to provide pilots critical information regarding not only their own aircraft, but aircraft in their immediate vicinity; some embodiments of the present invention may extend this application to not only the discussed dangers of formation flying, but single-ship general aviation procedures as well. Embodiments of the present invention discussed in the detailed description and shown in the drawings are not intended to restrict the scope of aircraft augmented reality applications, but rather, to illuminate the underpinnings and advantages brought about through variations on the proposed invention. Additional embodiments may be possible. The various embodiments may be used individually or together as may be needed or desired.

The figures will now be discussed in-depth to describe the present invention. FIG. 1 illustrates an example of a distributed data network, generally designated 100, across a serial during formation flight along with associated hardware for each chalk aircraft, in accordance with an embodiment of the present invention. The formation flight distributed data network 100 includes user input 110, the network itself 120, and an operatively coupled device package per aircraft chalk 130. The operatively coupled device package per aircraft chalk 130 may include both a computing device 131 and a display device 132. Aircraft positioning in the formation has substantial impact on the display of information through the display device 132, and one common arrangement of aircraft involving a leading aircraft 140 and trailing aircraft 150 is here shown. Formation flight must involve at least two aircraft, and if not simply leading and trailing in arrangement—such as if in a parallel or V configuration—the formation aircraft may instead be labeled numerically, e.g., a first, second, third aircraft and so on.

The terms "chalk," "serial" and "lift" as used herein are military aviation terms which describe aircraft in flight formations. They are discussed in Army Training Publication No. 3-04.1 "Aviation Tactical Employment," dated April 2016 (and, in particular, see Chapter 5, Section, V, pp 5-23), herein incorporated by reference in its entirety. In general, a "chalk" refers to a single aircraft comprised of the load contained within. A "serial" is a group of chalks. So, in a serial, different aircraft can be designated as chalk 1, chalk 2, chalk 3, so on and so forth, as an example. A "lift" is comprised of one or more serials having a serial designation like serial 1, serial 2, serial 2, and so on, as an example. All chalks should be designated within serials and lifts. Thus, an exemplary chalk designation of 1-2 refers to the serial 1, chalk 2.

The user input 110 may be accessed, filled-out, and submitted through an application on a mobile device or other platform, and is intended to be completed prior to the formation flight in accordance with the mission or objective. The user input 110 will be examined in additional depth in the discussion of FIG. 9. The network 120 may be any type of wireless network, to include, for example, a wireless local area network (WLAN), wireless personal area network (WPAN), wireless metropolitan area network (WMAN), wireless wide area network (WWAN), satellite-based networks, or any combination thereof.

The operatively coupled device package per aircraft chalk 130 includes, at a minimum, a computing device 131, but may further include a display device 132. In aircraft with a dual-pilot cockpit, more than computing device 131 and display device 132 may be present, along with a means or mechanism for indicating which pilot is actively on the controls. Computing device 131 is a compact computing device capable of collecting data from a variety of sensors and the user input 110, processing that data in-flight to generate a virtual overlay using virtual overlay program 204, and transmitting the generated overlay to display device 132. Computing device 131 is also capable of drawing and/or receiving data from like and networked computing devices on nearby aircraft to support with virtual overlay generation and to enable intelligent features such as collision avoidance detection.

Computing device 131 includes and/or is operatively connected to a pressure sensor 201, GPS receiver 202, processor 203, virtual overlay program 204, transceiver 205, and may further include accelerometers 206 and gyroscopes 207. The computing device 131 is being represented as the overall system for the aircraft. Some of elements, such as pressure sensor 201 and GPS processor 203, may already exist elsewhere on the aircraft and may provide input for the computer device 131. In other words, such elements need only to be operatively connected to the computing device 131. Although, in other embodiments, such elements may be incorporated into or otherwise a part of the computing device 131 itself. Pressure sensor 201 may include, for example, one or more, or any combination of digital pressure, analogue barometric pressure, and differential pressure sensors, to determine aircraft altitude. GPS receiver 202 may include one or more global positioning system receivers that provides accurate location data calculated from delays in signal propagation from four or more GPS satellites.

GPS data is a way used for determining and tracking the position of each aircraft. As received, GPS data describes a device's location and generally includes terms of longitude, latitude, altitude, and the time that the transmission was received. Alternatively, aircraft altitude and location may be sourced to computing device 131 through any one of several existing internal or external aircraft systems designed to aggregate aircraft information. The use of known aviation-proximity sensors, such as RADAR, LIDAR, ultrasonic, or otherwise, can be included in or on the aircraft. Such sensors are common for most aircraft. They can be used to provide distance measurements between aircrafts as well as other objects. These measurements, in turn, can be used to estimate aircraft relative position in a formation. For instance, the system can be operatively configured to interact with the aviation-proximity sensors to measure and track distances between the aircrafts in formation.

Altitude measurements can be determined using the aircraft's altimeter. Altimeters traditionally use barometric pressure sensors for measuring ambient pressure outside the aircraft. Alternatively, GPS data which includes altitude information can be used. Virtual overlay program 204, runs on processor 203, and generates a unique virtual overlay informed by both user input 110 and the multitude of sensors on a network of computing devices 131.

Transceiver 205 is one or more transceivers capable of receiving and transmitting data with both an operatively coupled display device 132 and like computing devices 131 on network 120. It includes one or more antennas and other requisite hardware and processors for radio communications.

Integrating accelerometers 206 and/or gyroscopes 207 may improve the accuracy of collected location data by employing a hybrid navigation model consisting of both inertial and GPS systems. Hybrid navigation is today pretty-standard implementation in most advanced systems (aircraft, self-driving cars, etc.). A flight plan can be uploaded ahead of flight which provides the flight path. Such data may include mapping information setting forth the flight path. Precise data, like GPS, can be used for this purpose. The hybrid navigation model tracks the aircraft's position in real time and compares it to the flight path. The system responds to maintain the aircraft on the desired flight path by making correction to the flight controls. Hybrid navigational models may use neural networks or so-called fuzzy logic correction algorithms for more precise controls. One exemplary hybrid navigation system is described in the following paper: A. Hiliuta, R. Landry and F. Gagnon, "Fuzzy corrections in a GPS/INS hybrid navigation system," in IEEE Transactions on Aerospace and Electronic Systems, vol. 40, no. 2, pp. 591-600, April 2004, herein incorporated by reference in its entirety. This and other hybrid navigation models can be used in one or more embodiments to determine aircraft location and predict aircraft trajectory as a function of both the outputs of the GPS receiver and inertial data. Accelerometer 206 and gyroscope 207 may be packaged separately, or on a consolidated inertial measurement unit (IMU) chip. These hardware arrangements are standard to aviation industry practice are will not be further described herein.

Display device 132 includes an augmented reality display 210, gyroscope 211, compass 212, transceiver 213, and may further include a camera 214. Camera 214 can be any camera or imaging system. Ideally, it is a high-definition video camera for providing adequate views. While conventional video cameras that record in the visible spectrum may be used other cameras, such as those which record in "night-vision" and/or IR spectrums, might be also provided. These enable night missions. In other embodiments and implementations, various other imaging system can be used for added image capture capabilities which can provide other mission benefits. For instance, a second camera (preferably, configured to provide stereo vision) can be included to greatly enhances visional depth. Additional cameras might also be provided to increase the field of view in some instances.

Augmented reality display 210 is a wearable heads-up display through which the pilot is presented critical formation flight information during flight In embodiments, the display 210 may include a liquid crystal display (LCD), light emitting diode (LED) display or organic LED (LED) display, as non-limiting examples, operatively connected to the computing device 131 which generates and provides digital content data (e.g., video, image, sound, etc.). Augmented reality display 210 may be worn alone in the form of a headset, goggles, or glasses, or may be integrated into an existing aviation helmet design, as shown in 1100. In some implementations, a strap can be provided with the display 210 for securely coupling it to the wearer's head; it may be elastic and/or provided with adjustable attachment means, like Velcro® or a buckle.

Gyroscope 211 measures the orientation and angular velocity of the pilot's head thus providing the pilot's orientation. The compass 212 determining direction of the pilot's head thus providing the heading. The orientation data from the gyroscope 211, when paired with heading data from compass 212, may be used to map the pilot's overall operational view.

The mapping of the pilot's view is important to properly correlate the display of virtual view-dependent information with the pilot's view. This mapping allows for the estimation of the approximate location of a second aircraft in the pilot's view. Positional tracking algorithms are common and important for many headset displays, and include, for example, the well-known Oculus Rift. A discussion of a positional tracking algorithm for a heads-up display is provided in the following article: Ananth Ranganathan, "The Oculus Insight positional tracking system," AI Accelerator Institute, 27 Jun. 2022, available at: https://www.aiacceleratorinstitute.com/the-oculus-insight-positional-tracking-system-2/(and, in particular, see the subsection titled "Building a map and localizing"), herein incorporated by reference in its entirety. Essentially, an IMU helps predict movement between frames, and thus locations on the global map. Use of a second camera (stereo vision) can also greatly enhance global map accuracy. This algorithms and other positional tracking algorithms and models can be used in one or more embodiments to map the pilot's overall operational view on the display of the on augmented reality display 210. By developing a map that extends 180 degrees or more around the pilot, the approximate location of a second aircraft in the pilot's view can be tracked even when not in the immediate view of the pilot. If we assume the origin exists when the pilot is facing immediately forwards, the map can reasonably be expected to extend, at the least, about 100 degrees in yaw in either direction, such that visibility of other aircraft through side windows are included. However, if the aircraft forward of our aircraft is at the 90-degree point from the origin of said map, that would suggest the two aircraft are actually abeam one another (parallel)—anything further would be a change in formation configuration (and thus a change in leading/trailing aircraft). The same technique can be used in the pitch direction too. The views can be easily scaled to the display unit. For instance, for aircrafts and object close to the pilot, virtual information can be depicted/displayed nearly to the center of the display whereas those farther away can be depicted/displayed at the edges or periphery of the display. In that way, the virtual displayed information approximates the virtual viewpoint of the wearer. The estimated positioning of a second aircraft may be used to inform the placement of key information on augmented reality display 210.

Transceiver 213 transmits and receives data with an operationally coupled computing device 130. It includes one or more antennas and other requisite hardware and processors for radio communications. Camera 214 may be one or more outward facing cameras strategically positioned to capture the perspective of the pilot for the purposes of improved second aircraft detection and tracking. The cameras 214 preferably collect imagery from the vantage point of a pilot in the aircraft for the purposes of improved second aircraft detection and tracking. In some embodiments, a forward-facing camera is provided in the aircrafts. The camera in trailing aircraft(s) thus can provide a "view" of leading aircraft(s). Alternatively or additionally, in embodiments, a backward-facing camera is provide in the aircrafts. The camera is leading aircraft(s) thus can provide a "view" of trailing aircraft(s). Taken together, the various views can be input to the system and made available to the pilots given them better situational awareness.

Figure 3:
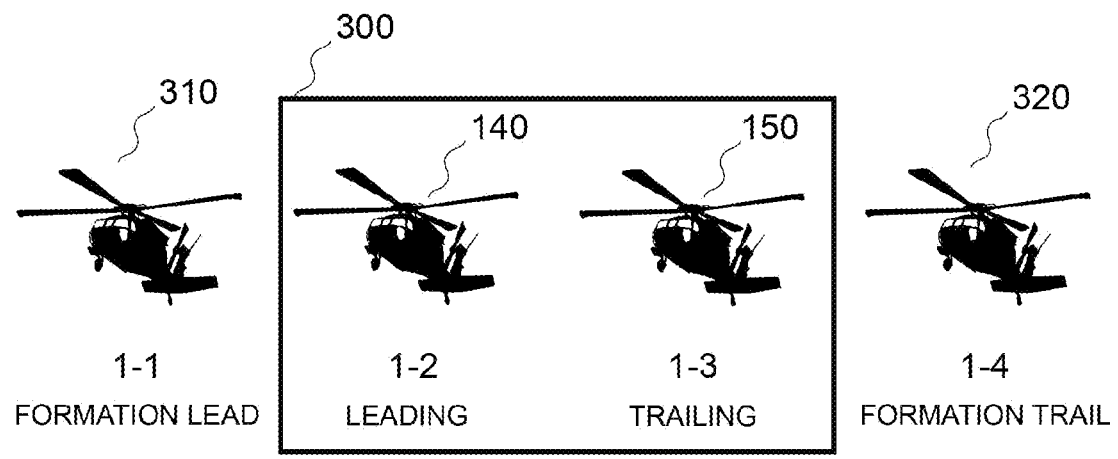
FIG. 3 depicts an example of formation flight along with associated naming conventions for key aircraft, in accordance with an embodiment of the present invention.

FIG. 3 depicts an example of formation flight along with associated naming conventions for key chalk aircraft, in accordance with an embodiment of the present invention. Innumerable flight formation configurations exist, and although a linear flight configuration is here shown, it is to be understood that the present invention is not limited to the depicted configurations. Aircraft coupling 300 depicts two chalk aircraft, which may be leading 140 and trailing 150 in nature, or otherwise simply denoted as first and second. Typically, a formation lead aircraft 310 and formation trail aircraft 320 is designated, as these strategic positions play critical roles during both regular flight operations and emergency procedure response. Formation lead aircraft 310 and formation trail aircraft 320 may therefore feature key differences in their associated augmented reality overlays compared to aircraft located in the mid-section of the formation.

Figure 4:
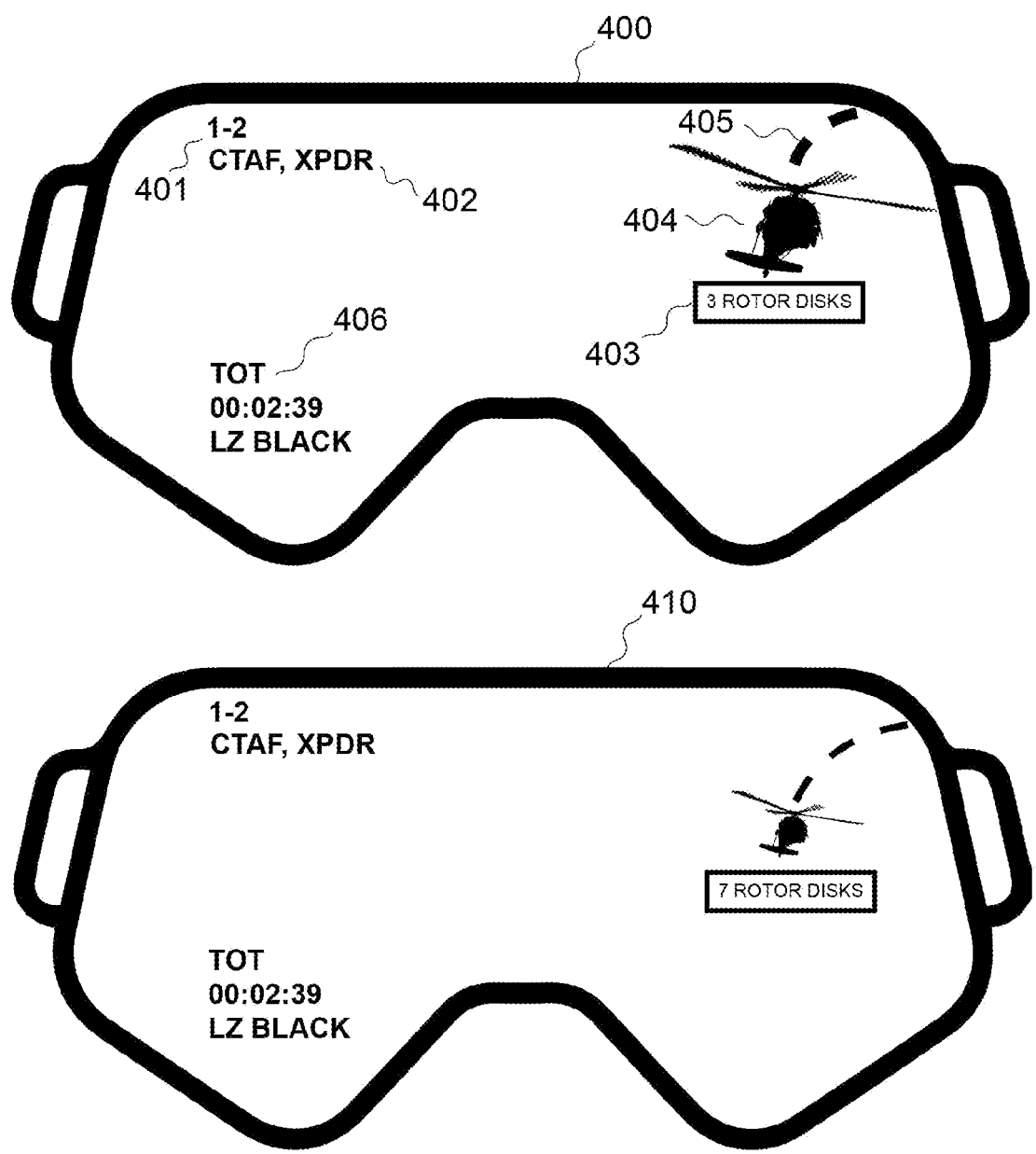
FIG. 4 depicts an example of an augmented reality virtual overlay for a trailing aircraft, with the leading aircraft at different distances, in accordance with an embodiment of the present invention.

FIG. 4 depicts an example of an augmented reality virtual overlay in a trailing aircraft (such as the 1-3 trailing aircraft 150 depicted in FIG. 3), with the leading aircraft 404 (such as the 1-2 leading aircraft 140 in FIG. 3) virtually displayed on an augmented reality display embodied as goggles, at different distances, in accordance with an embodiment of the present invention. The goggles would be worn by a pilot or co-pilot of the trailing aircraft. In the first trailing display 400, the leading aircraft 404 is estimated to be approximately three rotor disks away. In the second trailing display 410, the leading aircraft 404 is estimated to be approximately seven rotor disks away. For briefing purposes, helicopter separation is often operationally defined by units of rotor disks, as opposed to meters or feet; tight spacing is one to two disks of separation, close spacing is three to five disks of separation, loose spacing is six to ten disks of separation, and extended spacing is greater than ten rotor disks. The conversion from traditional units of distance to operational units is yet another function of computing device 131. Notably, formation aircraft may not be rotary wing in nature, and may therefore use different units of measure. This information may be captured in user input 110. It is further noted that any aircraft other than the leading aircraft could wear display 410 (as they are technically trailing, some aircraft).

The computing device 131 may be configured to take distance estimate values and divide by a user-input spacing variable for a given aircraft to compute the operational unit for distance, like rotor disk.

As shown in trailing displays 400 and 410, the accurate estimation of the leading aircraft position in the trailing pilot's view 404 allows for the dynamic placement of relevant information, such as distance estimation metric 403 and estimated trajectory 405, around that position, so as not to interfere with the pilot's view of the leading aircraft. Although heads-up displays are characterized by the transparent (see-through) nature of their text and symbology, interfering in any manner with the pilot's view of an aircraft in proximity may prove dangerous. Further, for estimated trajectory 405 to be meaningful and correct, the trajectory must be instantiated at the leading aircraft's current position. Estimated trajectory 405 may be visualized differently depending on the separation distance of the leading aircraft and the presumed accuracy of the trajectory itself; for example, the trajectory path may be thicker if the leading aircraft is closer, and thinner if the leading aircraft is further away.

Additional information of value that may be denoted on the overlay includes serial and chalk position 401, associated position-based responsibilities 402, and time on target details 406. Serial and chalk position 401 may be dynamically updated depending on the relative position of an aircraft in formation as determined by computing devices 131 on network 120. Lead changes are common in formation flight, and aircraft may not maintain their initial positioning throughout the duration of a mission. Certain emergency procedures such as lost communication procedures also involve changes in formation flight positioning. Associated position-based responsibilities 402 are tied to an aircraft's serial and chalk number and must therefore be updated as well. Examples of associated position-based responsibilities 402 include making certain radio calls, opening and closing flight-plans, and attaining situation or weather information. In the figures, "LZ BLACK" refers to the present condition at the target, that is, the landing zone is dark.

Time on target (TOT) is a military aviation term. It refers to the time remaining in flight to a defined geographic coordinate (end point), typically where some mission-driven requirement is to occur, as part of the flight plan. Time on target details 406 may include the name of the upcoming waypoint, as well as time to and/or distance from the upcoming waypoint and destination. It can be computed by taking the difference in end position and current position (distance), and by knowing the current aircraft velocity (rate) and flight path, converted to a time (time). A simple conversion for an aircraft flying at constant velocity in a straight line to the target is time=distance/rate. Although, more sophisticated flight duration estimation algorithms exist and could be used. Initial serial and chalk position 401, associated position-based responsibilities 402, and time on target details 406 may all be defined in user input 110 as part of an initial mission briefing. In the figures, TOT is presently indicated at 2 minutes and 39 seconds.

Figure 5:
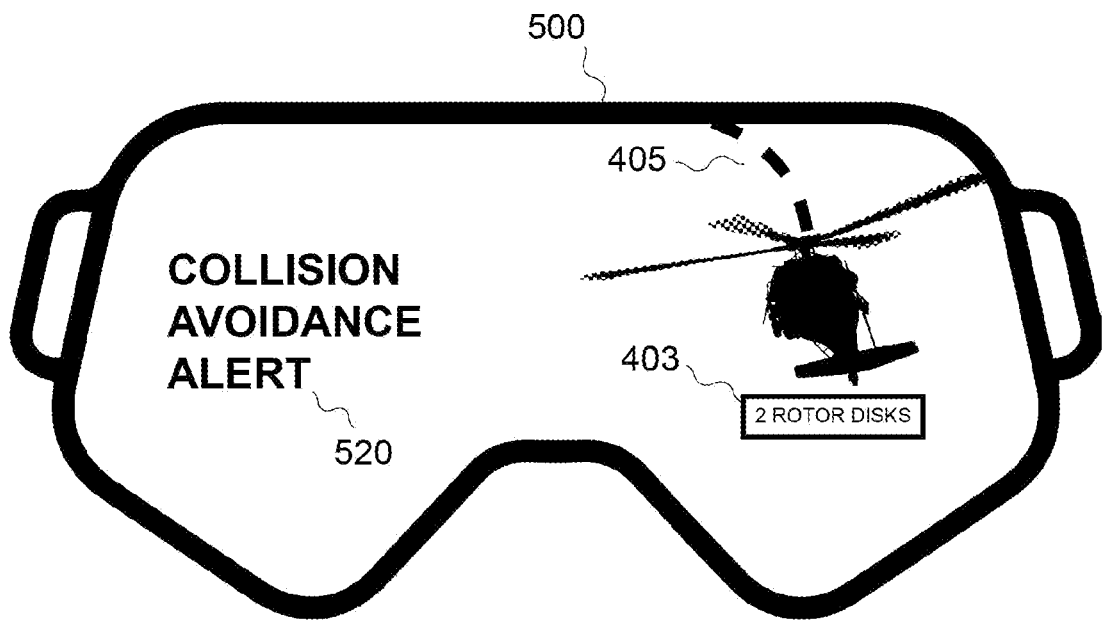
FIG. 5 depicts an example of an augmented reality virtual overlay for a trailing aircraft, with an issued collision avoidance alert, in accordance with an embodiment of the present invention.

FIG. 5 depicts an example of an augmented reality virtual overlay for a trailing aircraft, with an issued collision avoidance alert, in accordance with an embodiment of the present invention. The risk of mid-air collisions increases significantly during formation flight, and these collisions are often fatal. In the case of a collision avoidance alert, the overlay 500 is stripped of all but the most critical information—namely, a prominently featured collision avoidance text alert 520, distance estimation metric 403, and estimated trajectory 405. The user may adjust which and how information is displayed in all instances to include collision avoidance, in user input 110.

Figure 6:
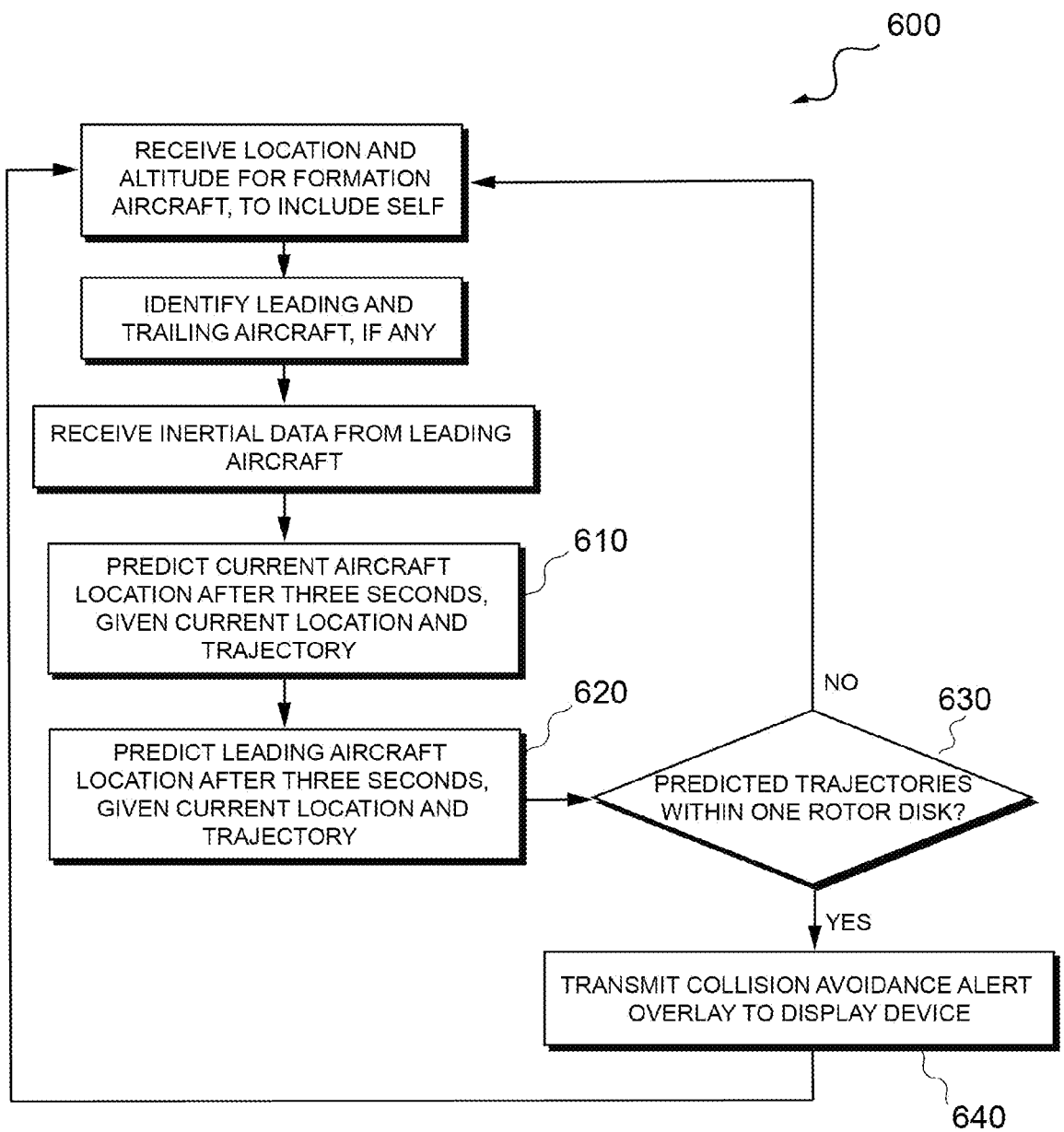
FIG. 6 depicts a flowchart of a computer-implemented algorithm illustrating one example of how a collision avoidance alert may be determined and displayed, in accordance with an embodiment of the present invention.

FIG. 6. depicts a flowchart for a computer-implemented algorithm, generally designated as 600, illustrating one example of how a collision avoidance alert may be determined and displayed, in accordance with an embodiment of the present invention. Location and altitude information is collected by computing devices 131 and shared among formation aircraft on network 120. Each aircraft's relative position in the formation is determined and leading and trailing aircraft couples 300 are designated. In non-linear formations where leading and trailing aircraft couples cannot be determined, each aircraft may be coupled with its closest neighboring aircraft. The trailing aircraft in each couple then receives inertial data from its leading aircraft; similarly, in-nonlinear formations, each aircraft receives inertial data from its closest neighboring aircraft.

The computer-implemented algorithm depicted in FIG. 6, is a predictive algorithm which essentially forecasts the aircraft's future location. It uses an exemplary 3 second forecast window. But other times for the forecast window can be used with a caveat. Too far in time, and the trajectory will likely be incorrect with the addition of new pilot control inputs. And too little in time and the response time to critical situations (like a mid-air collision) will be too little to prevent catastrophe. As demonstrated in 610 and 620 respectively, the current and leading aircraft's trajectories are predicted using a combination of location, altitude, and inertial data, out to a certain timestep, as defined using user input 110. Reducing the extent of prediction results in reduced notification time in a potential mid-air collision but serves to reduce the collision avoidance alert's sensitivity in tightly spaced formations. If the trajectory of two aircraft comes within a single rotor-disk 630, or an otherwise defined non-acceptable separation distance defined in user input 110, the collision avoidance alert overlay 500 is displayed 640. This methodology is not limited to aircraft couples and can be extended such that each aircraft is actively tracking the predicted trajectory of each other aircraft in the formation.

Figure 7:
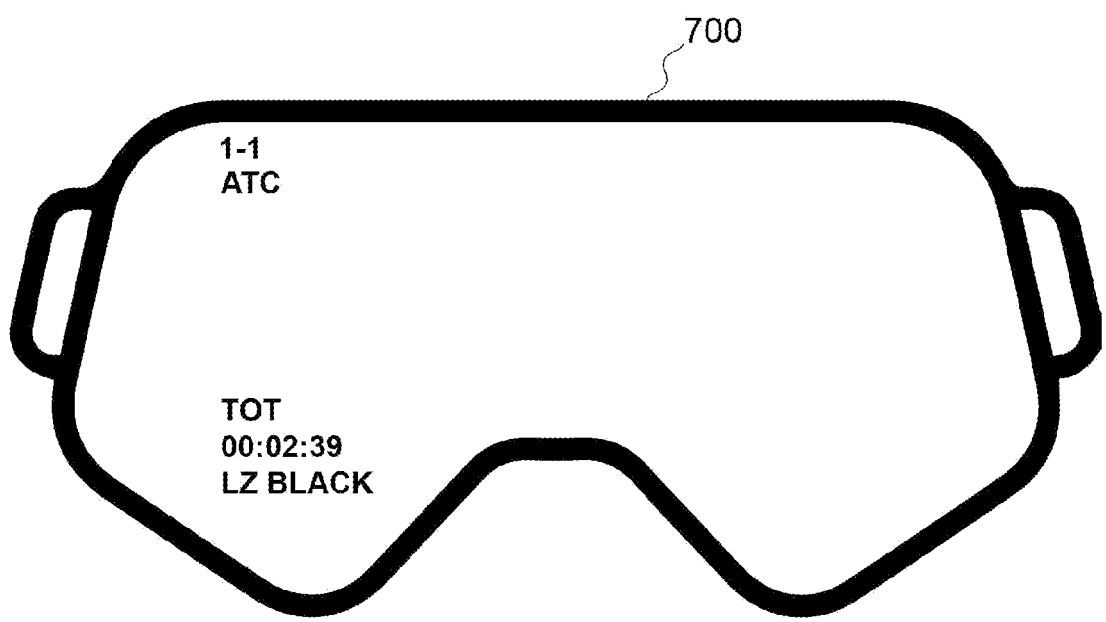
FIG. 7 depicts an example of an augmented reality virtual overlay for a formation lead aircraft, in accordance with an embodiment of the present invention.

An interesting edge case arises for the formation lead aircraft, which is not coupled to a leading aircraft. FIG. 7 depicts an example of an augmented reality virtual overlay, generally described as 700, for a formation lead aircraft (e.g., 1-1 formation lead aircraft 310 in FIG. 3), in accordance with an embodiment of the present invention. Serial and chalk position 401, associated position-based responsibilities 402, and time on target details 406 are all displayed, while distance estimation metric 403 and estimated trajectory 405 are absent. The formation lead aircraft may forego display device 132 altogether given the reduced benefit; however, the formation lead aircraft's computing device 131 remains critical to properly support operations in the aircraft trailing it.

Figure 8:
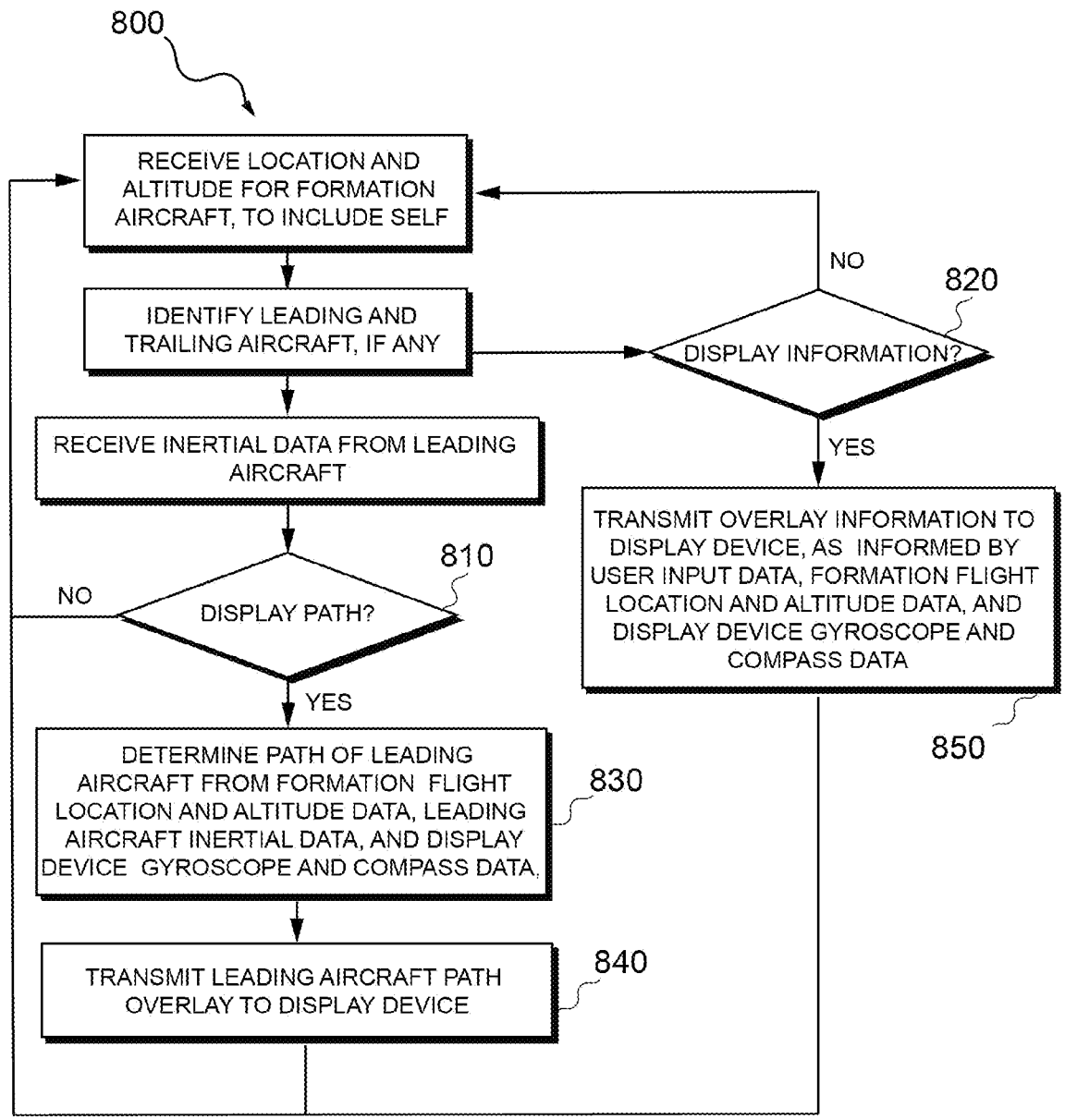
FIG. 8 depicts a flowchart of a computer-implemented algorithm illustrating an example of the decision-making function of a virtual overlay program, in accordance with an embodiment of the present invention.

FIG. 8 depicts a flowchart for a computer-implemented algorithm, generally designated as 800, illustrating an example of the decision-making function of a virtual overlay program, in accordance with an embodiment of the present invention. As in FIG. 6, location and altitude information is collected by computing devices 131 and shared among formation aircraft on network 120. Each aircraft's relative position in the formation is determined and leading and trailing aircraft couples 300 are designated. In non-linear formations where leading and trailing aircraft couples cannot be determined, each aircraft may be coupled with its closest neighboring aircraft. The trailing aircraft in each couple then receives inertial data from its leading aircraft; similarly, in-nonlinear formations, each aircraft receives inertial data from its closest neighboring aircraft. Formation flight information 820 and predicted path of the leading aircraft 810 may be displayed on the generated overlay per 850 and 840 respectively depending on user input 110 selections. Users may elect to reduce the amount of information displayed on display device 132 based on the mission type and the planned extent of aircraft spacing. This feature is intended to be accessible and editable prior to or in-flight.

Figure 9:
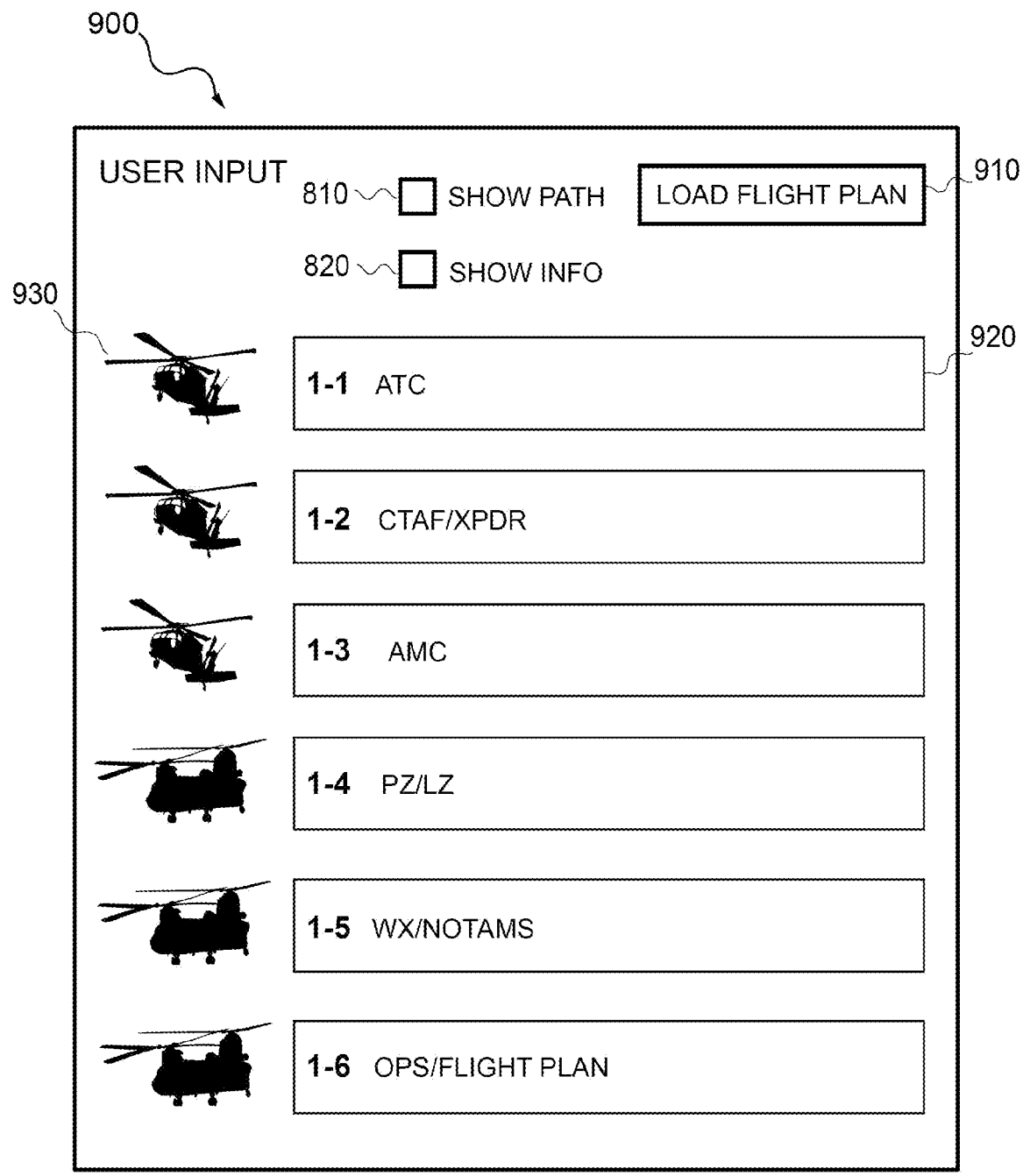
FIG. 9 depicts an example of a computer-generated user input form to be filled by a pilot prior to flight, that defines the display of information on the augmented reality display device, in accordance with an embodiment of the present invention.

FIG. 9 depicts an example of user input 110, in a digital and editable submission form, generally designated as 900, to be filled by a pilot prior to flight, that defines the display of information on the augmented reality display device, in accordance with an embodiment of the present invention. It may be generated and implemented via at least one computing device. Editable submission form 900 may include one or more formation flight information selection options 820 and one or more leading aircraft predicted path selection options 810; these selection options allow the user to personalize generated overlays in a mission-specific manner. A mechanism for loading the intended flight plan 910 allows for the display of time on target details 406. Providing the number, type, and ordering of formation aircraft 930 and associated responsibilities for each serial and chalk position 920 further allows for the display of serial and chalk position 401 and associated position-based responsibilities 402 on the generated overlay. The information should be relevant to the user group. The exemplary text associated with the chalk positions 920 depicted there is lingo understood by one select group of pilots, for instance. Other pilot groups will use other terms and lingo. The exemplary text associated with the chalk positions is the assigned roles and responsibilities of the formation flight. For example, ATC is talking with air traffic control to attain clearances, CTAF is talking with the common traffic advisory frequency, XPDR is setting the transponder code, AMC is the air mission commander, so on and so forth.

Figure 10:
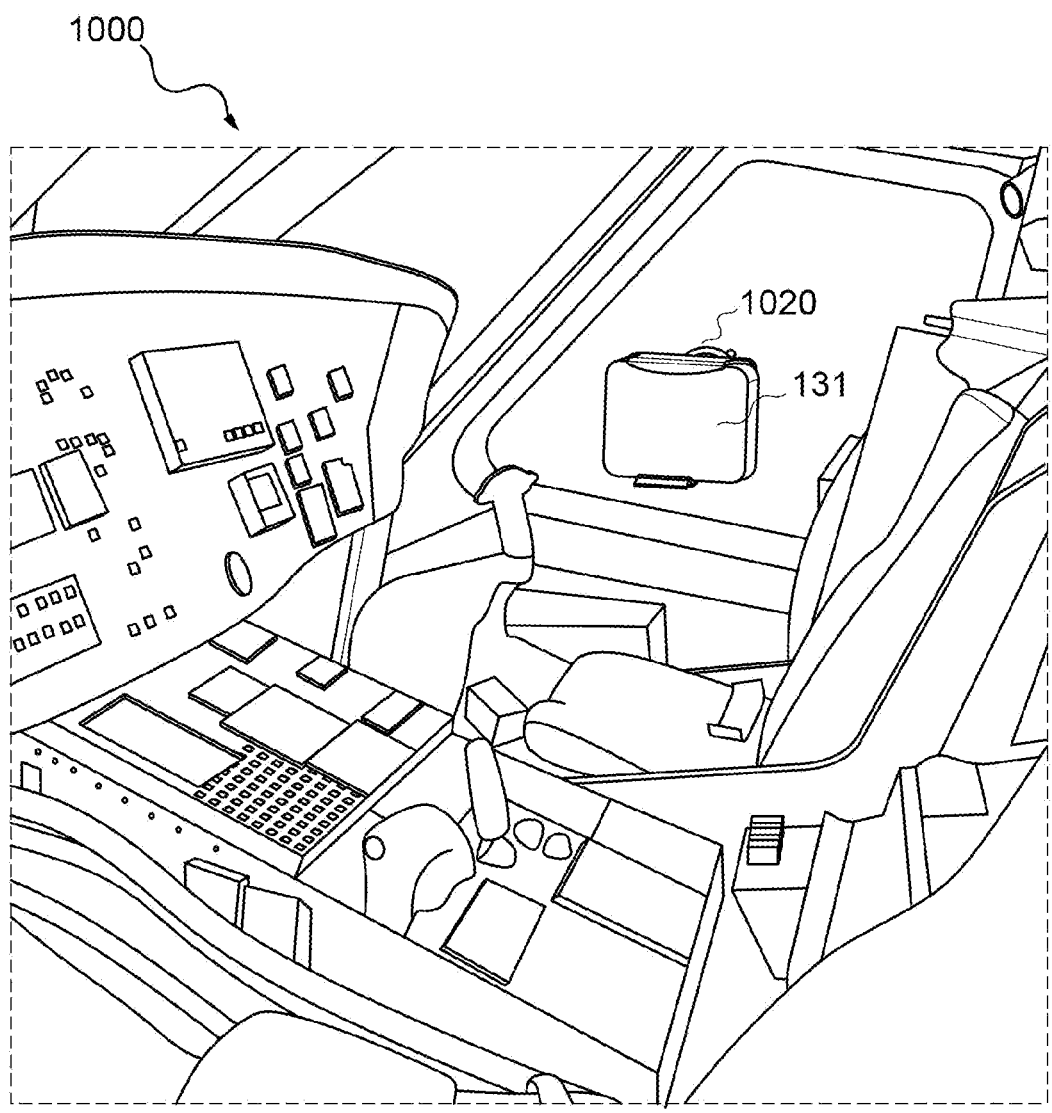
FIG. 10 depicts an example of the computing device as mounted to an aircraft cabin door window.

FIG. 10, generally designated as 1000, depicts an example of the computing device 131 mounted to an aircraft cabin door window. Computing device 131 may be mounted anywhere on—but not necessarily in—the aircraft, whether that be a cabin door window, the glare shield, or consoles. A direct connection to the aircraft itself is needed for the accurate collection of inertial aircraft data. Mounting mechanism 1020 may include any combination of one or more suction cups, pieces of tape, and any other adhesive material or structure.

Figure 11:
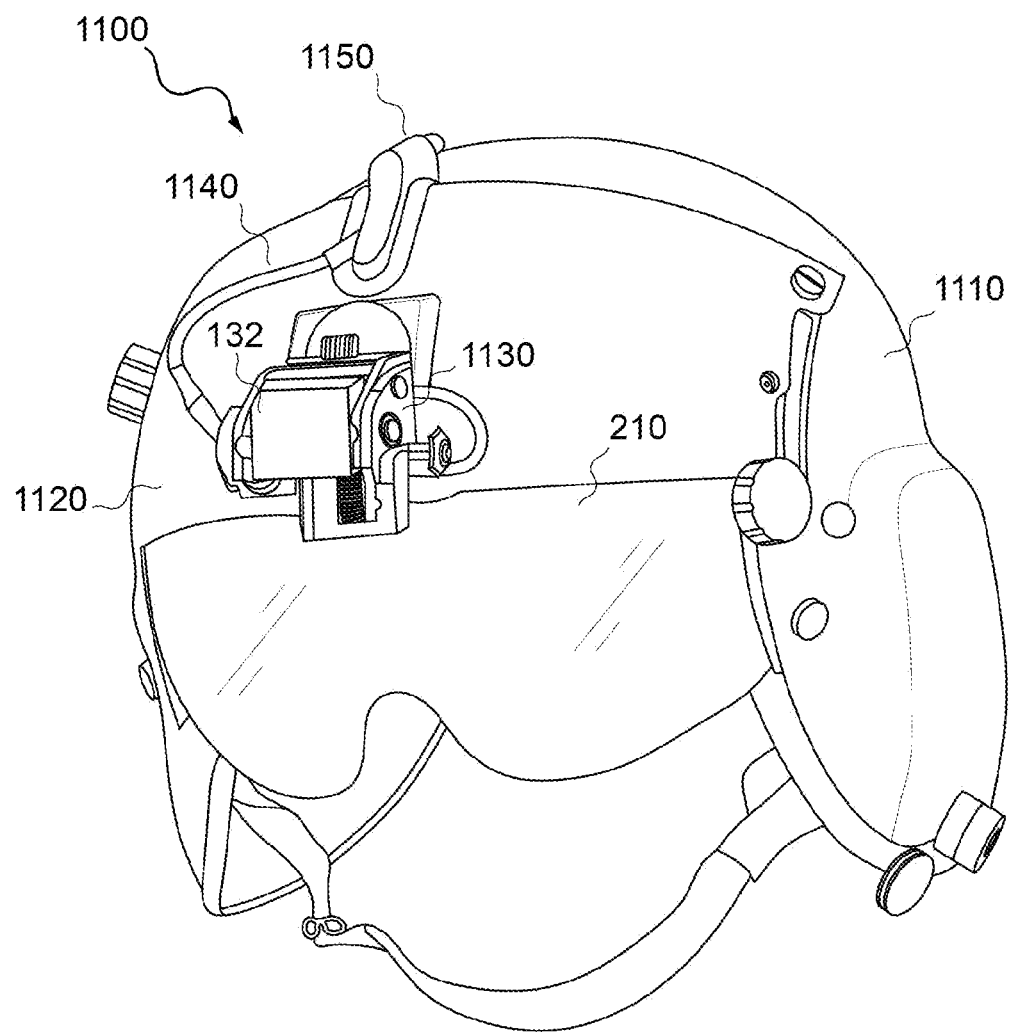
FIG. 11 depicts an example of the augmented reality display device display as integrated into an existing aviation helmet design.

FIG. 11 depicts an example of the augmented reality display device display as integrated into to an existing aviation helmet design and is generally designated as 1100. In embodiments, the system may make use of existing or modified aviation helmets. For instance, HGU-56P is the standard Army aviation helmet, and the helmet displayed here and modified for the invention. Display device 132 may be attached to the mounting assembly 1130, commonly used for the attachment of night vision devices. Mounting assembly 1130 contains internal electrical leads that allow for the transfer of power to the attached device; this power is commonly transferred through power transfer cord 1140 to the battery pack port 1150. Display device 132 may be strategically placed on any location on helmet shell 1110 or visor assembly 1120; however, regulatory helmet mass and moment requirements must be considered. Augmented reality display 210 is here visualized as a visor that seamlessly integrates with visor assembly 1120.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A system for calculating and displaying formation flight information in an aircraft, to include the predicted trajectory of a second aircraft, using an augmented reality display device, the system comprising:
    one or more augmented reality display devices wearable by a pilot of an aircraft, each located with a different aircraft in the formation, each augmented reality display device comprising:
        one or more gyroscopes for measuring orientation and/or angular velocity of the pilot and/or one or more compasses for determining direction of the pilot;
        one or more transceivers for transmitting and receiving data with an operatively coupled computing device in the same aircraft; and
        one or more augmented reality displays comprising a display screen at least partially transparent which is configured to display information; and
    one or more computing devices, each located within a different aircraft in the formation, to include at least one aircraft in the formation containing an augmented reality display device, each computing device comprising and/or operatively connected to:
        one or more pressure sensors for measuring ambient pressure outside each aircraft;
        one or more global positioning system (GPS) receivers for determining and tracking the position of each aircraft;
        one or more transceivers for transmitting and receiving data with a computing device in a second aircraft;
        a processor configured to estimate aircraft relative position and altitude as a function of the outputs of one or more pressure sensors, one or more GPS receivers, and/or data received from the computing device in the second aircraft;
        one or more transceivers for transmitting and receiving data with an operatively coupled augmented reality display device; and
        a virtual overlay program for displaying information relating to aircraft relative position on the screen of the operatively coupled augmented reality display device.

2. The system of claim 1, wherein the one or more computing devices further comprise or are operatively connected to a plurality of accelerometers, each providing an inertial data output with respect to a different axis; and
    wherein the processor is further configured to determine aircraft location and predict aircraft trajectory as a function of both the outputs of the GPS receivers and inertial data in a hybrid navigation model.

3. The system of claim 1, wherein the one or more computing devices further comprise or are operatively connected to a plurality of gyroscopes, each providing an inertial data output with respect to a different axis; and
    wherein the processor is further configured to determine aircraft location and predict aircraft trajectory as a function of both the outputs of the GPS receivers and inertial data in a hybrid navigation model.

4. The system of claim 1, wherein the augmented reality display device further comprises one or more outward-facing cameras collecting imagery from the vantage point of a pilot in the aircraft for the purposes of improved second aircraft detection and tracking.

5. The system of claim 1, wherein information relating to aircraft relative position and altitude may be presented as either text or symbology via the virtual overlay program, and comprises chalk number, chalk-specific responsibilities, time on target (TOT) details, and/or the predicted trajectory of the second aircraft.

6. The system of claim 1, wherein the augmented reality display device is configured to provide an option to a pilot to differentiate between being the pilot on the controls and the pilot managing the cockpit, in the case of a two-pilot aircraft.

7. The system of claim 1, wherein a calculation of the position of the second aircraft on the first aircraft's augmented reality display is estimated by the one or more computing devices using the relative position of the second aircraft and heading and orientation data for a pilot in the first aircraft.

8. A method for calculating and displaying formation flight information on an augmented reality display device, comprising:
    collecting location and altitude data, each for a different formation aircraft forming a subsequent couple using computing devices, wherein a computing device on a leading aircraft is a lead computing device and a computing device on a trailing aircraft is a trail computing device;
    collecting inertial data for a leading aircraft using the lead computing device;
    determining the relative position of a trailing aircraft using collected data using at least one computing device;
    predicting the trajectory of a leading aircraft using collected data using the at least one computing device;
    collecting heading and orientation data for a pilot in the trailing aircraft using at least one augmented reality display device operatively coupled to the trail computing device; and
    transmitting a virtual overlay from the trail computing device to an operatively coupled augmented reality display device.

9. The method of claim 8, further comprising collecting location data using one or more global positioning system (GPS) receivers.

10. The method of claim 8, further comprising collecting altitude data using one or more pressure sensors.

11. The method of claim 8, further comprising collecting inertial data for a leading aircraft using one or more accelerometers and/or one or more gyroscopes.

12. The method of claim 8, wherein the predicted trajectory of the leading aircraft extends to a predetermined and user-adjustable time-step.

13. The method of claim 8, wherein the transmitted virtual overlay contains information and display options that are defined by a user input form that comprises chalk responsibilities and time on target (TOT) details.

14. The method of claim 8, further comprising estimating an assumed position of the leading aircraft on the trailing aircraft augmented reality display device using the relative position of the trailing aircraft and heading and orientation data for a pilot in the trailing aircraft.

15. A method for determining and displaying formation flight collision avoidance alerts on an augmented reality display device, comprising:
   collecting location, altitude, and inertial data, each associated with a different formation aircraft using computing devices;
   predicting the trajectory of its associated aircraft using collected data using at least one computing device;
   transmitting and receiving predicted aircraft trajectory information with each other computing device in the formation flight using at the least one computing device;
   determining whether its projected aircraft position at a predetermined and user-adjustable future timestep is within a predetermined and user-adjustable distance of the projected position of another aircraft using the at least one computing device; and
   issuing a collision avoidance alert to an operatively coupled augmented reality display device as deemed appropriate using the at least one computing device.

16. The method of claim 15, further comprising collecting location data using one or more global positioning system (GPS) receivers.

17. The method of claim 15, further comprising collecting altitude data using one or more pressure sensors.

18. The method of claim 15, further comprising collecting inertial data using one or more accelerometers and/or one or more gyroscopes.

19. The method of claim 15, wherein the predetermined and user-adjustable future timestep and predetermined, user-adjustable distance to another aircraft is modifiable by way of a user input form.

20. The method of claim 15, wherein the collision avoidance alert is presented as text and/or symbology and optionally color-coded separately from other indications on the augmented reality display for enhanced situational awareness.

* * * * *